(12) United States Patent  (10) Patent No.: US 9,005,033 B2
Figueroa  (45) Date of Patent: Apr. 14, 2015

(54) GAME MOVIE MAKER

(75) Inventor: Dan O. Figueroa, Foster City, CA (US)

(73) Assignee: Sony Corporation Entertainment America LLC, San Mateo, CA (US)

( * ) Notice: Subject to any disclaimer, the term of this patent is extended or adjusted under 35 U.S.C. 154(b) by 1130 days.

(21) Appl. No.: 12/101,820

(22) Filed: Apr. 11, 2008

(65) Prior Publication Data

US 2009/0258708 A1  Oct. 15, 2009

(51) Int. Cl.
 *A63F 13/45* (2014.01)
 *A63F 13/40* (2014.01)
 *A63F 13/30* (2014.01)
 *G07F 17/32* (2006.01)

(52) U.S. Cl.
 CPC .............. *A63F 13/10* (2013.01); *A63F 13/12* (2013.01); *A63F 2300/554* (2013.01); *A63F 2300/634* (2013.01); *G07F 17/3295* (2013.01)

(58) Field of Classification Search
 USPC .......................................................... 463/43
 See application file for complete search history.

(56) References Cited

U.S. PATENT DOCUMENTS

| | | | |
|---|---|---|---|
| 4,342,454 A * | 8/1982 | Baer et al. ........................ | 463/31 |
| 5,261,820 A * | 11/1993 | Slye et al. ......................... | 463/1 |
| 5,377,997 A * | 1/1995 | Wilden et al. .................... | 463/43 |
| 5,395,242 A * | 3/1995 | Slye et al. ......................... | 463/1 |
| 5,558,339 A * | 9/1996 | Perlman .......................... | 463/42 |
| 6,338,680 B1 * | 1/2002 | Connors .......................... | 463/43 |
| 6,419,581 B2 * | 7/2002 | Asai et al. ....................... | 463/32 |
| 6,594,674 B1 * | 7/2003 | Kaplan et al. .......................... | 1/1 |
| 6,654,539 B1 * | 11/2003 | Duruoz ......................... | 386/343 |
| 6,699,127 B1 * | 3/2004 | Lobb et al. ...................... | 463/43 |
| 6,769,987 B1 * | 8/2004 | Morita et al. ................... | 463/31 |
| 7,614,956 B2 * | 11/2009 | Lind et al. ....................... | 463/42 |
| 2002/0142845 A1 * | 10/2002 | Randall Whitten et al. .... | 463/43 |
| 2003/0114227 A1 * | 6/2003 | Rubin ............................. | 463/43 |
| 2004/0121837 A1 * | 6/2004 | Chiang et al. .................. | 463/24 |
| 2007/0167216 A1 * | 7/2007 | Walker et al. .................. | 463/18 |
| 2007/0211720 A1 * | 9/2007 | Fuchs et al. .................... | 370/390 |
| 2007/0254742 A1 * | 11/2007 | O'Brien .......................... | 463/42 |
| 2008/0051171 A1 * | 2/2008 | Lutnick et al. .................. | 463/20 |
| 2008/0096663 A1 * | 4/2008 | Lieberman et al. ............. | 463/42 |
| 2008/0194333 A1 * | 8/2008 | Zalewski ........................ | 463/42 |
| 2009/0118018 A1 * | 5/2009 | Perlman et al. ................. | 463/42 |
| 2010/0146258 A1 * | 6/2010 | David et al. .................... | 713/150 |
| 2011/0269540 A1 * | 11/2011 | Gillo et al. ...................... | 463/31 |
| 2014/0040879 A1 * | 2/2014 | Goldman ....................... | 717/175 |

\* cited by examiner

*Primary Examiner* — Seng H Lim
(74) *Attorney, Agent, or Firm* — Procopio, Cory, Hargreaves & Savitch, LLP

(57) ABSTRACT

Methods, apparatuses, and techniques for recording a user's game play experience. The player's game play can be recorded by recording a player's commands as the player navigates a game level as well as game data that can include a state of the game and variables, such as random numbers, generated during the game play that were used to control aspects of the game. The recording of the player's game play can then be reviewed and shared with others.

3 Claims, 8 Drawing Sheets

GAME MOVIE MAKER

BACKGROUND

1. Field of the Invention

The present invention relates to electronic games, and more specifically, to saving game data that can be rendered and viewed.

2. Background

Computer entertainment game systems and gaming technology have advanced over the years from the simple games such as Pong® and Tetris® to very complex shooter and sport games that have high speed, high resolution graphics and can be played in multi-player environments. Increased sophistication of features have increased players' interest in the games as well as increasing the difficulty of playing the games. In addition, many games now have multi-player options which enable players from all over the globe to participate in a single-game environment using one or more consoles interconnected by an online network such as the Internet. In this online environment players have access to large numbers and wide ranges of opponents of varying skill levels.

Many games have various levels, where a player needs to successfully navigate through a series of obstacles or scenarios before the player can move to the next level. It may take the player many tries before they are successful in making it through a level. Because of this learning curve or puzzle solving challenge inherent in games, auto-save locations may be inserted at strategic points in a game or a save-game feature may be included so that a player may re-enter a game again from a given point. Once a player is successful in making it through a level, the player enjoys telling other players about their success. The successful player may also inform other players about the way that they successfully traversed the level so that the other player may try the same techniques when they play the game. While the players want to engage in these types of interactions it is often difficult for a player to effectively convey their experiences.

Thus, there is a need for improving techniques for players to review or recount their successful navigation through a game or a particular portion of a game or share their gaming experiences.

SUMMARY

Embodiments of the present invention provide systems, methods, and apparatus for recreating a user's game play experience. In one embodiment, a method for recreating a user's game play includes saving game-play data for the game console or machine that can be used to recreate a player's activity as the player navigates a particular game level or the entire game. If a player is successful in navigating a portion of the game the machine may automatically save the data for that portion, or prompt the player to determine if the player wants to save the game-play data. Game-play data can include for example, a player's commands and inputs to the game and game data such as game status and random numbers, or variables, that are generated during the game and that can be used to control aspects of the game.

In one embodiment, if the player is not successful in navigating the game level then the game-play data is erased. In another embodiment the player selects whether to save the game-play or not. In another embodiment, an auto save feature can be used to automatically save the game-play data. Saving the game-play data can include saving the game-play data to a hard disk.

In another embodiment, a method for recording a user's game-play data includes recording a player's commands as the player navigates a game level. Recording game data such as game status and random numbers that are generated during the game and that are used to control aspects of the game as the player navigates the game level. Then determining if the player successfully navigated the game level and if so saving the commands and game data.

In still another embodiment, rendering a media file of a player's game play includes selecting game levels for rendering a player's game-play. Retrieving game-play data files corresponding to the selected levels. Then assembling the retrieved files into a media file. In one embodiment, the recorded game-play data can include the player commands and game data used during the player's game-play. The retrieved files can be assembled into a game session file that can be replayed on a game console. In another embodiment, the recorded files can include recorded frames of the player's game play. The retrieved files can be assembled, for example, into a media file such as an audio video file.

In yet another embodiment, a console includes a user interface that receives a player's commands during playing of a game. The console also includes a processor that generates game data used to control aspects of the game. A memory that stores the player's commands and the game data as the player navigates portions of a game.

In another embodiment, a console includes a user interface that receives selected levels for rendering a player's game play. The console also includes a memory interface that retrieves game-play data corresponding to the selected levels. A processor assembles or renders the retrieved game-play data and presents the resulting game play to a user. In one embodiment, the stored game-play data includes player commands and game data of the player's game play. In another embodiment, the stored data include frames of the player's game play. In another embodiment a game console or computer and software retrieve the stored game-play data and begins an auto-play mode where the game console or computer inputs the stored game-play data and replays the successful navigation attempts resulting in a film-like rendering of the users game play in real time.

Other features and advantages of the present invention will become more readily apparent to those of ordinary skill in the art after reviewing the following detailed description and accompanying drawings.

DETAILED DESCRIPTION

Figure 1:
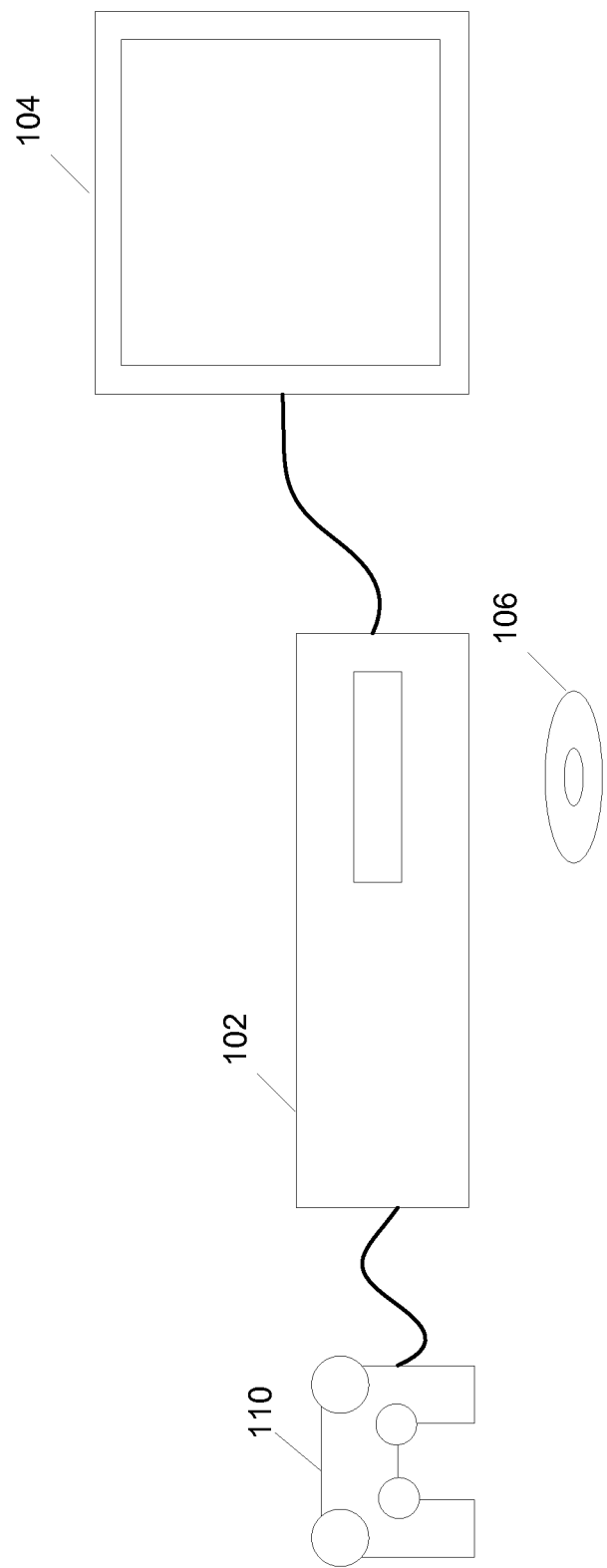
FIG. 1 is a block diagram illustrating a system that operates in accordance with an embodiment of the present invention.

After reading the following description it will be apparent to one skilled in the art how to implement the invention in various alternative embodiments and alternative applications. However, although various embodiments of the present invention will be described herein, it is to be understood that these embodiments are presented by way of example only, and not limitations. As such, this detailed description of various embodiments should not be construed to limit the scope or breadth of the present invention.

In one embodiment, a player's activities as they progress through a level of a game are recorded. If the player successfully negotiates the level, then the recorded game-play data can be saved. The game-play may then be rerendered showing the successful navigational paths by the player and shared with other players. For example, the player may enjoy reviewing their successful negotiation of the game level. Likewise, the player may send the game-play data, such as by emailing, to a friend so that they can recreate the player going through the game level.

In one embodiment, game-play data including, for example, game commands entered by the player during play of the game are saved along with game data that provides control variables of the game, are saved to a file. In other words, game data is data generated during the playing of the game. The game data is stored along with the player commands to make up the game-play data. Using this technique the file will generally be relatively small and is referred to as a "thin" file. The game data includes game parameters and variables, such as game status and random numbers that are generated during the game and that are used to control aspects of the game. For example the game data can control the artificial intelligence (AI) used during the game. Using this technique the files are generally small and easy to transfer. In one embodiment a game console and the game can be used to render the play back or recording of the session. In another embodiment, a computer or server operating game software may render that play back or recording of the game session.

In another embodiment, frames of the game play are recorded. In other words, as the player navigates the game level all of the frames, such as the audio and video of the game are stored. This technique will typically produce a large, or "thick", file. An advantage of a "thick" file is that it can be rendered without having to have the game that was used by the player when the recording was made. In other words, a "thick" file can be played back on a different viewer or ported to a standard audio visual file format and does not require the game console and game used in creating the recording.

In one embodiment, game-play data is saved only when a player is successful in completing a level or portions of a level of a game. In another embodiment, the player can determine if they want to save the game-play data recording whether they are successful in completing the level or not. After more than one set of game-play data are saved, the sets can be assembled into a larger file. For example, if a game has twenty levels and the player has saved game-play data of the player successfully completing all twenty levels, then the twenty game-play data sets can be combined into a single file of the player completing the entire game. In other embodiments, the player can select desired game-play data sets to be combined into a larger file.

In one embodiment, the game that is being played can be an online game. In this embodiment, the actions of all the players in the game can be recorded as the player navigates the game. For example, using a "thin" file technique, the players commands and actions, as well as the commands and actions of the other players and the game data are saved. Using a "thick" file technique the frames of the game during play can be recorded.

FIG. 1 is a block diagram illustrating a system that operates in accordance with an embodiment of the present invention. As illustrated in FIG. 1, a computer, or game console, 102 may be coupled to a video display 104 such as a television, monitor, or other type of visual display. A game or other simulations may be stored on a storage media 106 such as a DVD, a CD, flash memory, USB memory or other type of memory media. The storage media 106 can be inserted to the console 102 where it is read. The console can then read program instructions stored on the storage media and present a game interface to the user.

Typically, a user or player manipulates a game controller 110 to generate commands to control and interact with the video game or other simulation. The game controller 110 may include conventional controls, for example, control input devices such as joysticks, buttons and the like. Using the controller a user can interact with the game, such as by using buttons, joysticks, and movements of the controller 110, and the like. This interaction or command may be detected and captured in the game console 102. The user's inputs can be saved, along with the game data to record the game play. In one embodiment, the game data can include states of the game and variables such as random numbers generated during the game and used to control the game. Likewise, game data associated with the audio and video of the game play may be captured to record the user's experience as they navigate different levels of the game.

Figure 2:
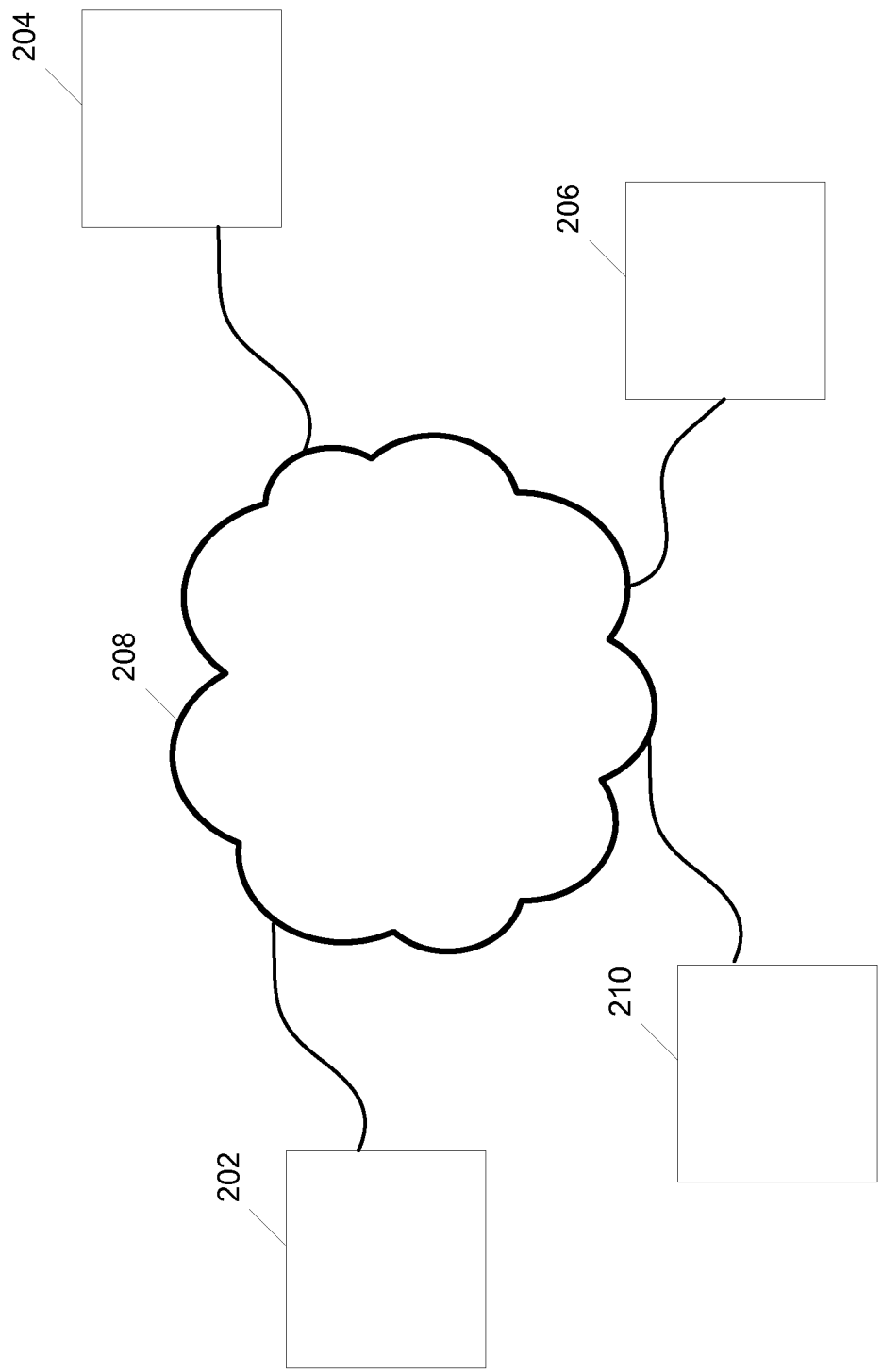
FIG. 2 is a block diagram of an example online environment.

FIG. 2 is a block diagram of an example online environment. As shown in FIG. 2, multiple players or users 202, 204, and 206 can interact and enter into online sessions, such as online games, over a network 208. The network 208 can be connected in many different architectures, for example, a Client Server architecture, a Peer-to-Peer network architecture, a mesh network, or other type of architecture. The online environment can also include a server 210 that coordinates the online session. The network 208 can be different types of networks. For example, the network 208 can be the Internet, a Local Area Network or any variations of Local Area Network, a Wide Area Network, a Metropolitan Area Network, an Intranet or Extranet, or a wireless network. Also, the term "online session" can be used to identify any network topology where different users are connected to a network and send and receive information from other users connected to the network. In one example, an online session can be an online game where users connected to the network send and receive information pertaining to a game.

As the players 202, 204 and 206 play the game, and navigate various levels, game-play data of their playing of the game can be recorded or saved. In one embodiment, the players commands as well as the game kernel are recorded using a "thin" file technique. In another embodiment the game play is recorded as audio and video frames of the game using "thick" file technique.

In one embodiment, the server 210 can be a game console, such as a PlayStation 3 (PS3) by Sony Corporation. Players 202, 204, and 206 can upload game-play files to the PS3. The PS3 can render and play back the game sequences to the players.

The players 202, 204, and 206 can use various devices to communicate with the networks 208. The players can use wireless or wired devices to communicate with the network 208. Players can also use various wired or wireless devices, such as a game console, a computer, an iPod by Apple Inc., a virtual world such as Home by Sony Corporation, a cell phone, or other devices to interface with the network 208.

Figure 3:
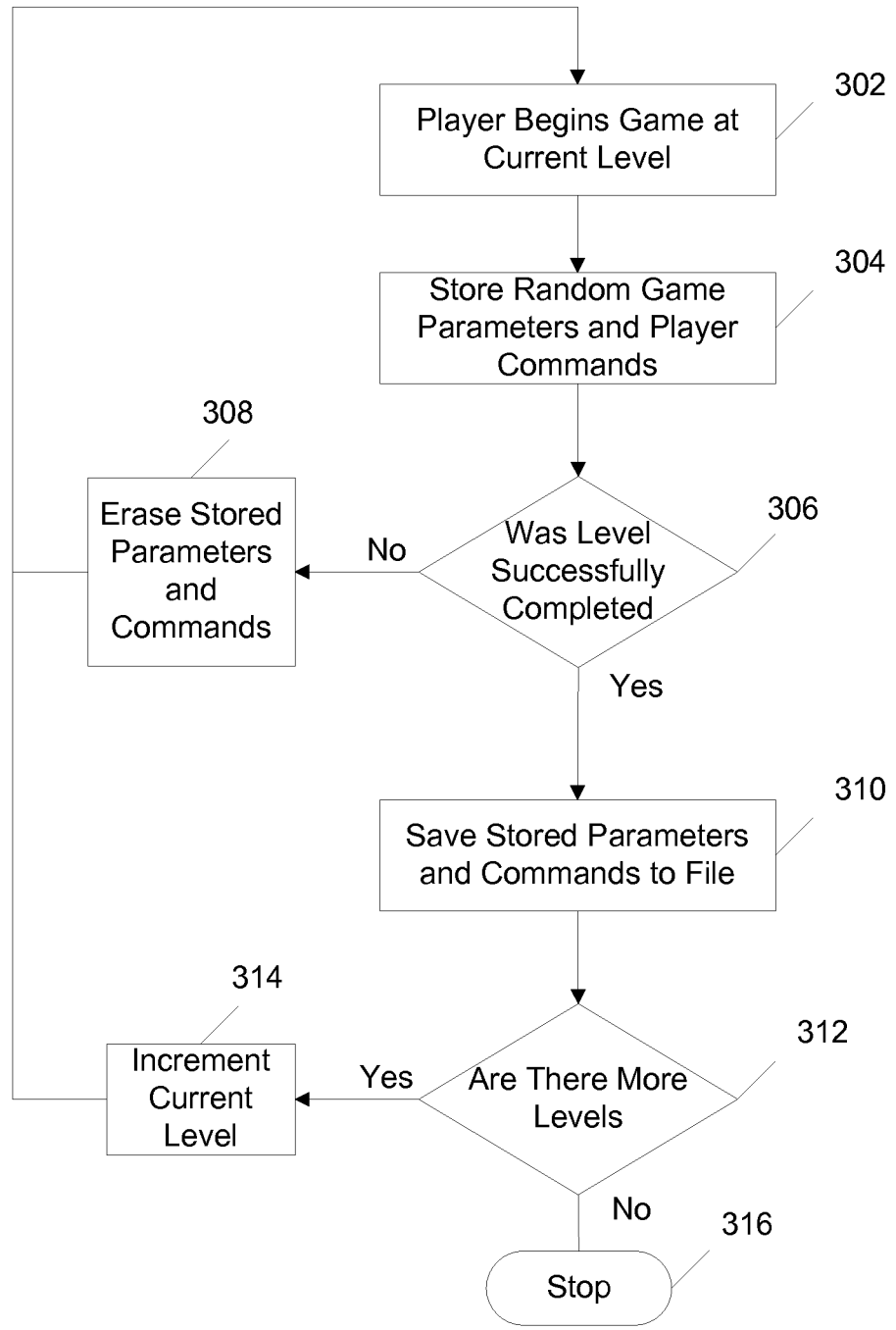
FIG. 3 is a flow diagram of an embodiment of recording a player's action as they navigate levels of a game.

FIG. 3 is a flow diagram of an embodiment of recording a player's action as they navigate levels of a game. Flow begins in block 302 where the player begins to play the game at the current level. For example, a player may be playing the game for the first time and so the current level would be the first level. If the player has previously played the game then the current level may be the last level of the game the play was not successful in navigating or at a point within a level.

Flow continues to block 304 where the commands input by the player as well as the game data are stored. The game data can include, for example, states of game as well as random game parameters that are generated during the playing of the game. Flow continues to block 306. In block 306, it is determined if the level was successfully completed. If a level was not successfully completed, flow continues to block 308. In block 308, the stored commands and game data are erased. Flow then continues to block 302 and the player begins to play the game at the current level. In another embodiment, in block 308 the stored commands and game data are not erased but can be saved to a file for later replay.

Returning to block 306, if the level was successfully completed, flow continues to block 310. In block 310, the player's commands and the game data are saved to a file. Flow then continues to block 312. In block 312, it is determined if there are more game levels for the player in the game. If there are more game levels, flow continues to block 314 and the current level is incremented to the next game level. Flow then continues to block 302 and the player begins playing the game at the new current level. Returning to block 312, if there are no more levels for the player to complete, flow continues to block 316 and flow stops. In one embodiment, the example in FIG. 3 is referred to as a thin file technique.

Figure 4:
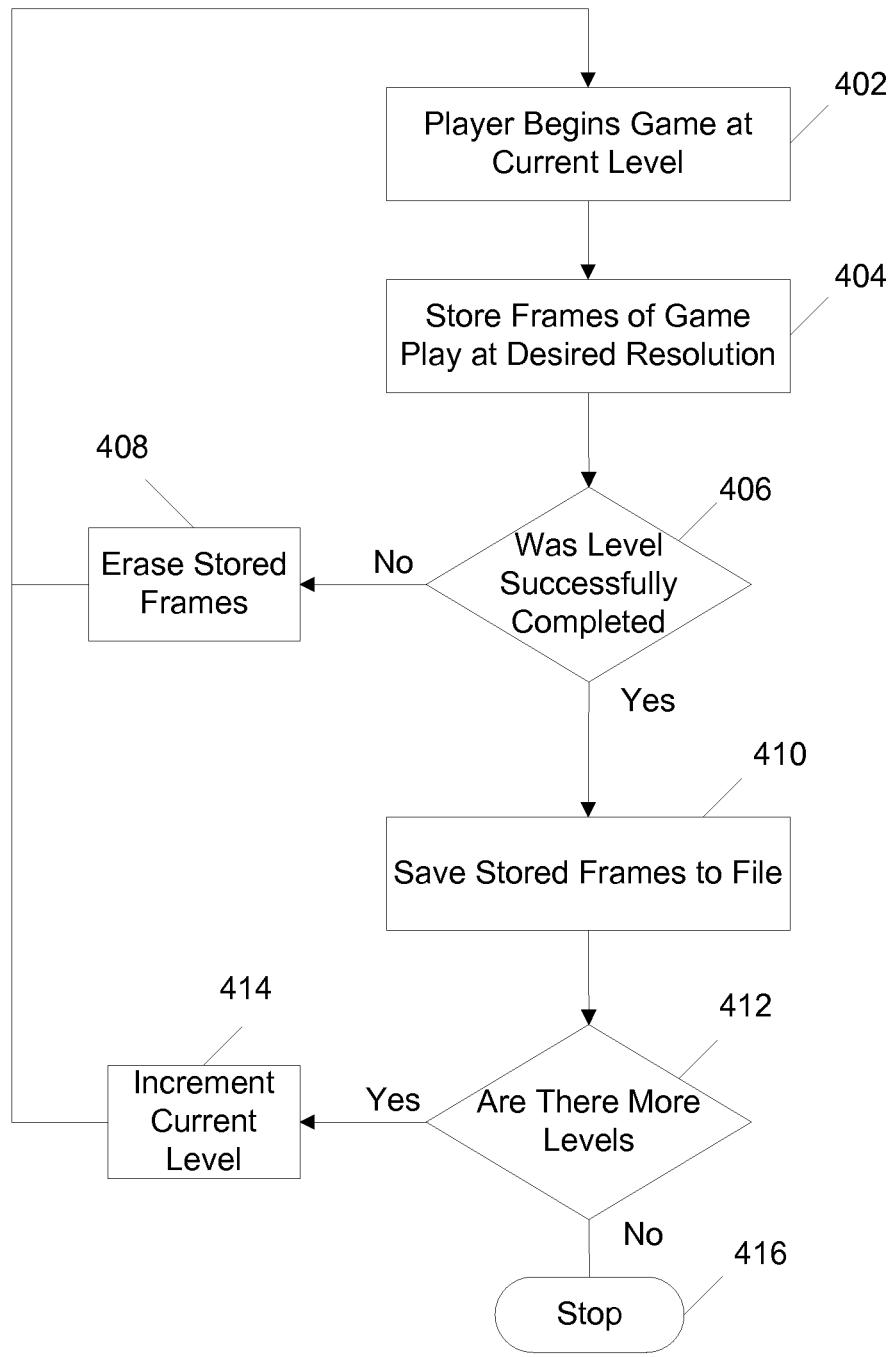
FIG. 4 is a flowchart illustrating an embodiment of recording a player's action as they navigate levels of a game.

FIG. 4 is a flowchart illustrating another embodiment of recording a player's action as they navigate levels of a game. Flow begins in block 402 where the player begins game play at the current level of the game. For example, a player may be playing the game for the first time and so the current level would be the first level. If the player has previously played the game then the current level may be the last level of the game the play was not successful in navigating.

Flow continues to block 404. In block 404 frames of the game that is being played are stored at a desired resolution. For example, a frame can be stored once every 60 seconds, or every 30 seconds, or at any desired resolution. The desired resolution can be based on an amount of memory available. Flow then continues to block 406. In block 406, it is determined if the level was successfully completed. If the level was not successfully completed, flow continues to block 408 and the stored frames are erased. Flow then continues back to block 402 and the player begins playing the game at the current level. In another embodiment, the stored frames are not erased but can be saved to a file for later replay.

Returning to block 406, if the game level was successfully completed by the player, flow continues to block 410. In block 410, the stored frames are saved to a file. Flow then continues to block 412. Where it is determined if there are more levels of the game for the player to complete. If there are more levels to complete, flow continues to block 414. In block 414, the current level is incremented to the next game level and flow continues to block 402 where the player begins to play the game at the new current level. Returning to block 412, if there are no more levels to play, flow continues to block 416 where flow stops. The example illustrated in FIG. 4 is one embodiment of the technique described as a thick file.

Figure 5:
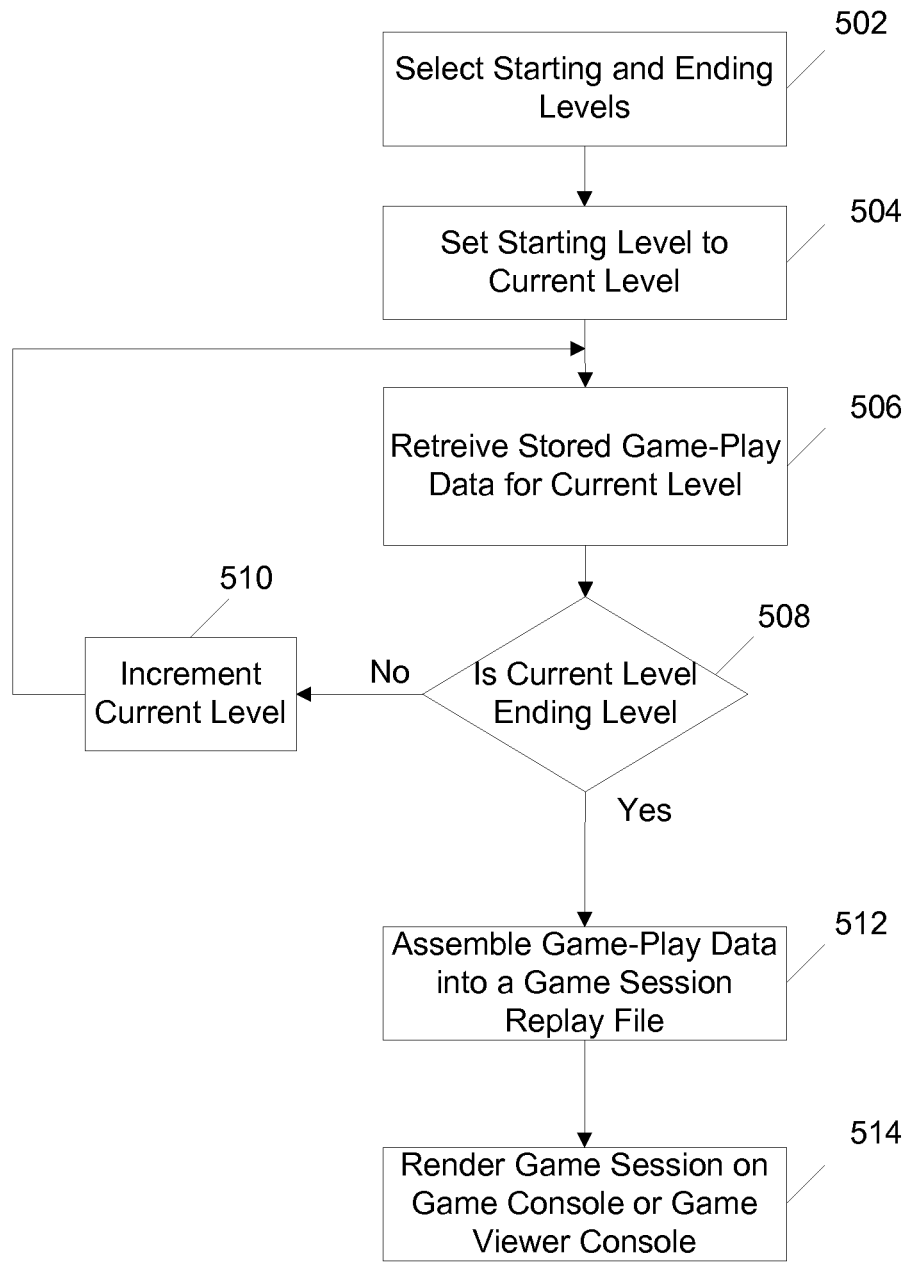
FIG. 5 is a flow diagram illustrating an embodiment of rendering a recorded game file.

FIG. 5 is a flow diagram illustrating an embodiment of rendering game-play data, referred to as a thin file, such as a file saved using techniques described in FIG. 3. In the embodiment illustrated in FIG. 5, a thin file can be rendered on a game console. Flow begins in block 502 where starting and ending game levels are selected. Flow then continues to block 504 and a current level value is set to the starting level that was selected. Flow continues to block 506 where stored game-play data for the current level are retrieved. Flow continues to block 508.

In block 508, it is determined if the current level is the ending level. If it is determined that the current level is not the ending level, flow continues to block 510 and the current level is incremented to the next selected level which is set to the new current level. Flow then continues to block 506 and the game-play data for the new current level are retrieved. Returning to block 508, if the current level is the ending level, flow continues to block 512. In block 512, the game-play data are assembled into a file to render the game session that was recorded. Flow then continues to block 514. In block 514, the game console or a game viewer console renders or replays the game session using the game-play data in the file. In another embodiment, the retrieved game-play data can be rendered for one level as the commands and parameters for the next level are being retrieved. In this way, one level can be rendered while the next level is being retrieved instead of retrieving all of the levels and then assembling the entire commands and parameters of the game before rendering.

Figure 6:
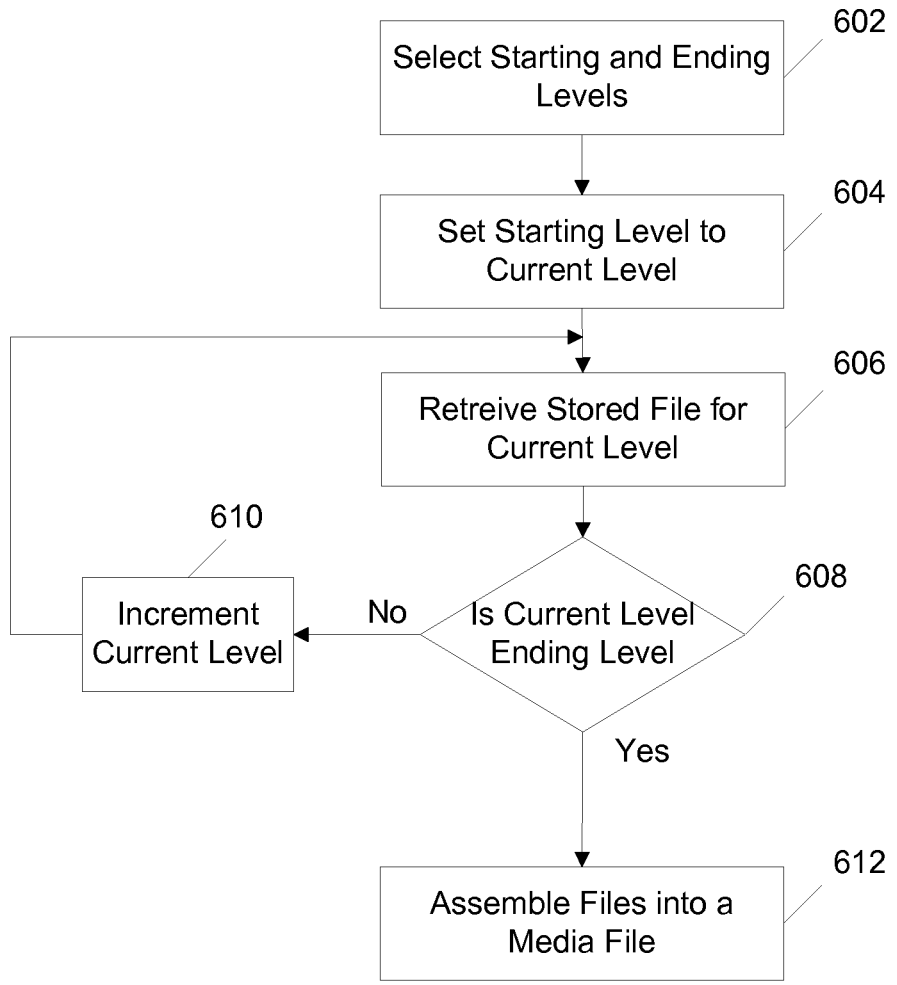
FIG. 6 is a flow diagram illustrating an embodiment of assembling a media file that includes the stored game files.

FIG. 6 is a flow diagram illustrating an embodiment of assembling a media file that includes the stored game frames such as the frames saved using techniques such as described in FIG. 4. Flow begins in block 602 where a starting and ending level of a game are selected. For example, a player can select the first and last game level (i.e., all the game levels), or a user can select desired game levels. For example, the first and second level, the first and last level, the second and last level, or any other desired combination of levels for the game play. Flow then continues to block 604. In block 604, the starting level selected in block 602 is set to the current level. Flow then continues to block 606.

In block 606, the stored frames for the current level are retrieved. Flow continues to block 608. In block 608, it is determined if the current level is the ending level. If the current level is not the ending level, flow continues to block 610. In block 610, the current level is incremented to the next level that was selected which is set as the new current level. Flow then continues to block 606 where the new current level stored frames are retrieved. Returning to block 608, if the current level is the ending level, flow continues to block 612. In block 612, the retrieved frames are assembled into a media file. For example, the retrieved frames can be assembled into an audio-video file, or multi-media file, that a player can share with other players or review themselves.

Figure 7:
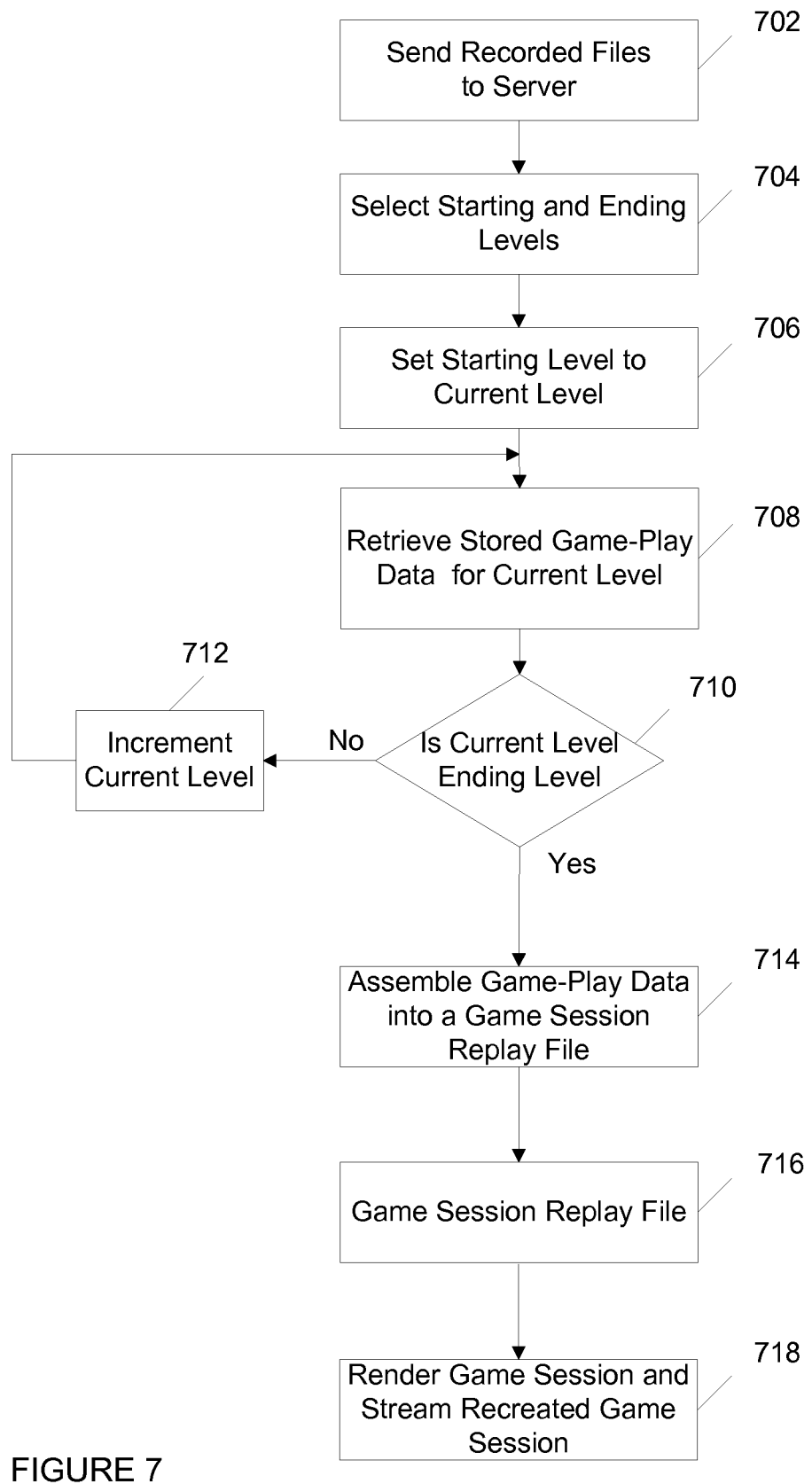
FIG. 7 is a flow diagram illustrating an embodiment of rendering a recorded game file.

FIG. 7 is a flow diagram of rendering a recorded game session file on a server. Flow begins in block 702 where a player sends recorded session files to the server. Flow continues to block 704 where a starting and ending level are selected. For example, the player that sent the files to the server can select the starting and ending levels, or another player or user that wants to view the session can select the starting and ending files or all the levels sent can be automatically selected. Flow continues to block 706. In block 706, the current level is set to the selected starting level. Flow then continues to block 708.

In block 708, the game-play data including a player commands and game data that have been stored for the current level are retrieved. Flow continues to block 710. In block 710, it is determined if the current level is the ending level. If in block 710 it is determined that the current level is not the ending level, flow continues to block 712 where the current level value is incremented to the next selected level that is set to the new current level. Flow then continues to block 708 and the game-play data for the new current level are retrieved. Returning to block 710, if it is determined that the current level is the ending level, flow continues to block 714. In block 714, the game-play data are assembled into a game session replay file. Flow then continues to block 716. In block 716, the game session replay file is rendered. Flow continues to block 718. In block 718, the rendered game session can be streamed or otherwise transmitted to the user desiring to observe the replay. In another embodiment, the game session is rendered real-time as game-play data of a level are retrieved. In this way, the rendering can occur real time as it is being streamed to a user.

Figure 8:
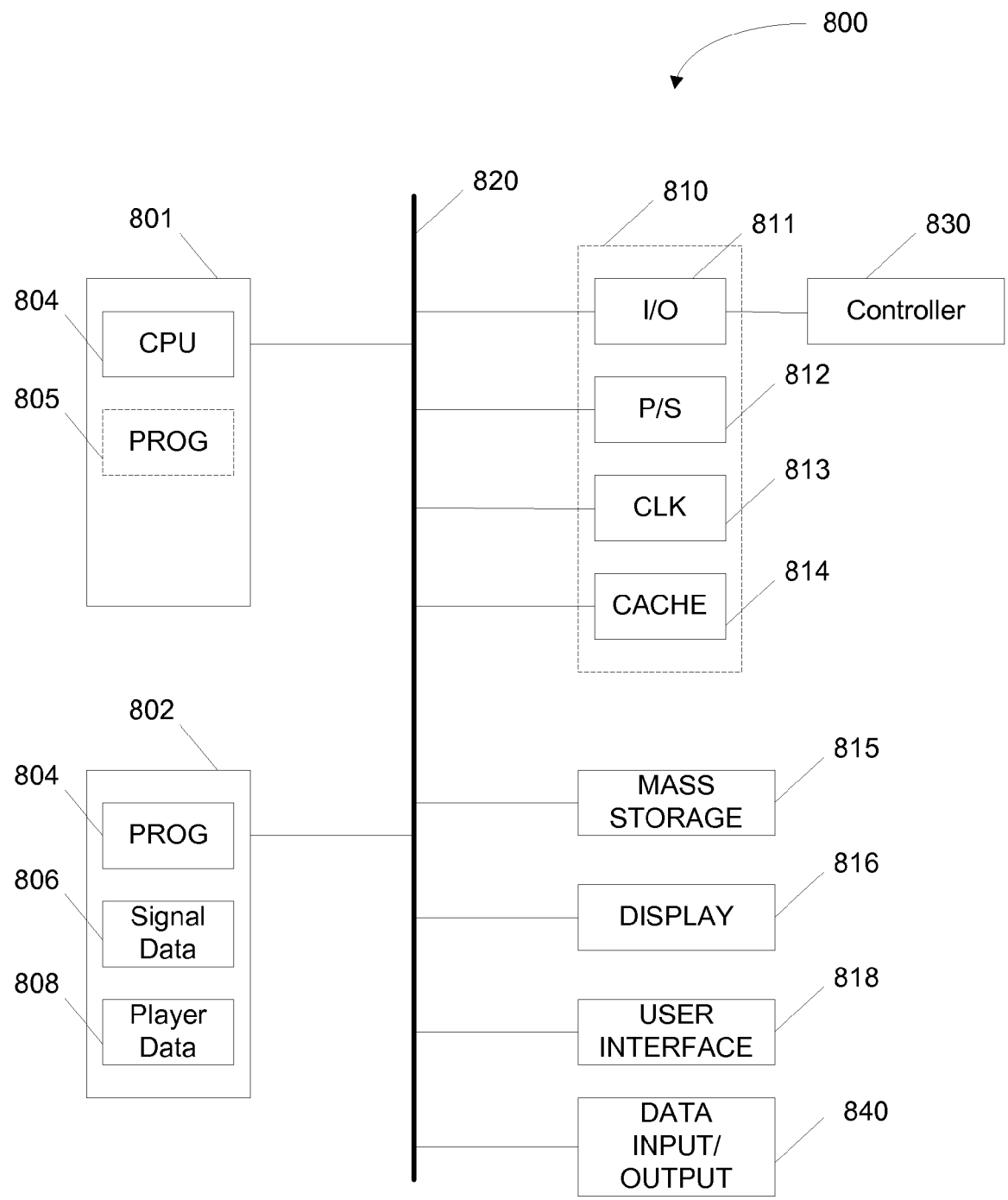
FIG. 8 is a block diagram of a gaming system 800 that may be used to implement various embodiments described herein.

FIG. 8 is a block diagram of a gaming system 800 that may be used to implement various embodiments described herein. As shown in FIG. 8, the gaming system 800 may include a processor module 801 and a memory module 802. In one embodiment, memory module 802 may be RAM, DRAM, ROM and the like. In addition, the gaming system 800 may have multiple processor modules 801 if parallel processing is to be implemented. The processor module 801 can include a central processing unit 803. In addition, the processor module 801 can include local storage or a cache to store executable programs. The local storage can also store player commands and game kernel during the play of a game. The memory module 802 can include game program storage 805. In addition, the memory module 802 can include signal data storage 806, for example, signal data acquired from game controller operated by a user. The memory module 802 may also store player commands and game kernel during play of a game. The memory module 802 can also include player data 808 such as player profile data as well as game statistics that may be provided.

The system 800 may also include well-known support function module 810 such as input/output module 811, power supplies 812, a clock 813, in cache memory 814. There can also be a controller 830 that interfaces to the input/output module 811. The system 800 may also optionally include mass storage module 815 such as a disc drive, CD ROM drive, DVD drive, tape drive or the like to store programs and/or data. The mass storage module 815 may also store player commands and game kernel files recorded during play of a game. The system 800 may also optionally include a display module 816 as well as a user interface module 818 to facilitate interaction between the system 800 and the user. Display module 816 may be in the form of a cathode ray tube, a flat panel screen or any other display module. The audio and video of the game play can be saved to the memory module 802 or mass storage 815.

The user interface module 818 may include a keyboard, mouse, joystick, write pen or other device such as a microphone, video camera or other user input device. The processor, memory, and other components within the system 800 may exchange signals such as code instructions and data with each other via a system bus 820.

The system 800 may also include a data input/output module 840. The data input/output module can be a network interface module. For example, the data input/output module 840 can interface to a local area network, a wide area network such as the Internet, or other network. In addition, the interface to the network can be wired or wireless.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The term "module" as used herein means, but is not limited to a software or hardware component, such as an FPGA or an ASIC, which performs certain tasks. A module may advantageously be configured to reside on an addressable storage medium and configured to execute on one or more network enabled devices, processors or gaming systems. Thus, a module may include, by way of example, components, processes, functions, attributes, procedures, subroutines, segments of program code, drivers, firmware, microcode, circuitry, data, databases, data structures, tables, arrays, variables, and the like. The functionality provided for in the components and modules may be combined into fewer components and modules or further separated into additional components and modules. Additionally, the components and modules may advantageously be implemented to execute on one or more network enabled devices or computers.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or process described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. Thus, the invention is not intended to be limited to the embodiment shown herein but is to be accorded the widest scope consistent with the principal and novel features disclosed herein.

What is claimed is:

1. A method for recording a path of completed levels of a game by a player, the method comprising:
    determining if the player completed a particular level of the game,
    wherein the player completes a level of the game when the player makes it through the level, and
    wherein the game includes a plurality of levels including a start level and an end level;
    storing data captured during gameplay of the particular level of the game by the player to a file if it is determined that the player completed the particular level of the game; and
    discarding the data captured during the gameplay of the particular level of the game by the player if it is determined that the player did not complete the particular level of the game,
    wherein as the player plays through the plurality of levels of the game, the data captured during the gameplay of each completed level is saved to each respective files and when the end level is reached, files for all levels from the start level to the end level is combined into a single video file such that contents of the single video file upon completion of the game comprise data representing a completed path of the gameplay taken through the game from the start level to the end level.

2. The method of claim 1, further comprising
    creating a replay of the completed path of the gameplay taken through the game from the start level to the end level using the single video file.

3. The method of claim 2, wherein a particular level is replayed while the next level is being retrieved.

* * * * *